No. 864,036. PATENTED AUG. 20, 1907.
E. SCHENCK.
WEIGH CRANE.
APPLICATION FILED OCT. 11, 1906.

WITNESSES:
W. M. Avery
Chas. W. Wright

INVENTOR
Emile Schenck
BY
Munn & Co
ATTORNEYS

UNITED STATES PATENT OFFICE.

EMIL SCHENCK, OF DARMSTADT, GERMANY.

WEIGH-CRANE.

No. 864,036.  Specification of Letters Patent.  Patented Aug. 20, 1907.

Application filed October 11, 1906. Serial No. 338,422.

*To all whom it may concern:*

Be it known that I, EMIL SCHENCK, manufacturer, and a subject of the Grand Duke of Hesse, residing at Darmstadt, in the Grand Duchy of Hesse, German Empire, have invented certain new and useful Improvements in Weigh-Cranes, of which the following is a specification.

This invention relates to weigh-cranes, that is, to cranes which are fitted with a weighing device adapted to indicate the weight of the load which is suspended from the hook of the crane.

In weigh-cranes as hitherto constructed either the weighing arrangement is arranged between the hook of the crane and the load, where it is very inconvenient and is liable to be damaged, or the component force acting upon the jib-roller or other guide roller of the chain, cable or the like, is allowed to act on a weighing arrangement. This method is very inexact, owing to the indefiniteness of the frictional resistances arising. It is also customary to run the whole crane of the crane chariot on to a weigh-bridge to determine the desired weight from the gross weight of the crane inclusive of the load, by subtracting the tare of the crane. This method has the disadvantage for determining the net weight, that a dead load must also be weighed with it, which is often fifteen to twenty times as great as the net load. Finally also weigh-bridges have been built in the crane or crane chariot on which the load drum and the supporting organs are arranged. The durability of such weighing arrangements can obviously not be very great, and the whole mechanism is very complicated.

According to the present invention the problem is solved, and at the same time the above mentioned disadvantages are avoided, by adapting the jib of the crane to act as the weigh-beam and arranging the chain, cable or the like to pass through the rotary point or fulcrum of the jib or beam before reaching the drum or windlass. This arrangement avoids the accuracy of the weighing machine being in any way affected by the chain, cable or the like, running to the drum. Consequently, by the swinging of this lever no movement of the chain or cable is occasioned in the pulling direction, and therefore, no disturbing frictional resistances are set up.

Figure 1:
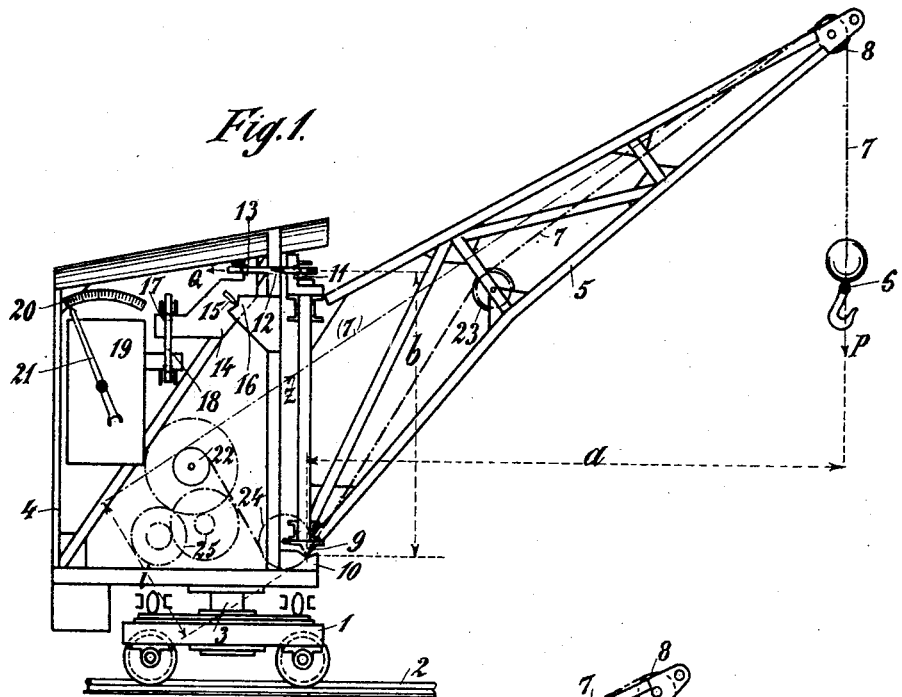

In the accompanying drawings Figure 1 shows a transportable turning crane of the kind often used in harbors. A carriage 1 which is conveyed on rails 2 carries the crane proper rotatory around the shaft 3.

The crane proper consists of the guide and scale-house 4, containing the scale and the lifting-jack, and of the jib 5.

The load P is suspended from the jib-hook 6 which is attached to the cable or chain 7 sliding on the jib-roller 8 of the jib 5, the latter forming a self-contained or rigid bell-crank lever the steel edge 9 of which forms the fulcrum of the weigh-beam and rests in the step bearing 10 fixed to the crane proper.

Attached to the jib 5 is a second edge 11 suspended in a runner 12 which is provided on each end with steps and acts upon the steel edge 13 of a beam 14 the edge 15 of the latter rests in the step 16 fixed to the crane proper.

An edge 17 on the other end of the beam 14 is by means of a runner 18 connected to an automatical weighing device 19 of any suitable construction which shows the weight of the load on a scale 20 by an index or pointer 21.

If a load P is attached to the hook 6 a strain Q is transferred to the weighing device 19 by the runner 12.

As per the equation:

$$P.a = Q.b \quad (cf. \text{ Fig. 1})$$
$$P. = Q.\frac{b}{a}.$$

As, now, Q can be determined directly by the scale, P can also easily be determined, the ratio $\frac{b}{a}$ being constant.

If the chain or cable were conducted directly to the drum 22 as shown by the line 7, Fig. 1, the momentum $Z.i$ caused by the pull Z in the cable would be opposed to the load-momentum $P.a$ and act upon the jib. Therefore it would influence the oscillation of the jib and check the play of the scale. By this influence an exact weighing would be impossible so much the more as the pull Z which is varied by the unavoidable changing of the frictional resistance cannot be exactly determined. Thus the accuracy and sensitiveness of the weighing mechanism would be considerably decreased and for this reason the chain or cable 7 slides on the jib-roller 8 over the roller 23 to the roller 24 arranged in such a manner that the cable is conducted through the fulcrum of the jib formed by the edge 9, so that the lever arm $i = 0$, and the momentum $Z.i = 0$. From the roller 24 the chain is carried to the drum 22 which is driven in the well known manner by a gearing 25 by hand or motor.

Figure 2:
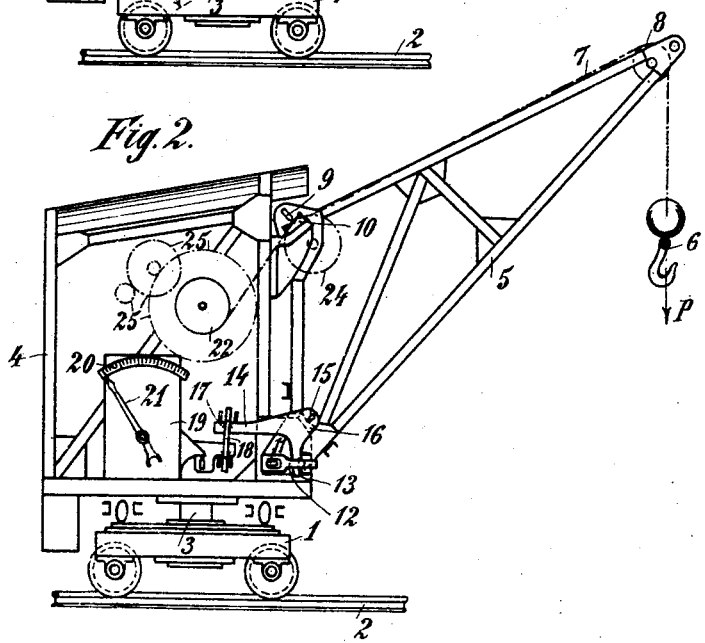

Fig. 2 represents another example of construction in which the fulcrum 9 is arranged on the top and the runner 12 on the bottom side of the jib. This device acts in the same manner as the one described above.

Corresponding parts are marked by corresponding reference numbers.

Naturally there are many other ways of carrying out the present invention.

Having thus described my invention what I claim as new and desire to secure by Letters Patent, is

1. In a weigh-crane, a jib adapted to act as a weigh-beam, a winch drum, a load cable, and means for guiding the load cable to the winch drum so that it passes through the fulcrum of the jib acting as a weigh-beam, for the purpose hereinbefore set forth.

2. In a weigh-crane, a jib adapted to act as a weigh-beam, a fulcrum for the latter, a weighing machine, a connection from the beam to the weighing machine, a load cable passing over the head of the jib, and a drum, and means for guiding said cable to the winch drum so that it passes in a direction through the fulcrum of the jib, for the purpose hereinbefore set forth.

3. In a weigh-crane, a jib adapted to act as a weigh-beam, a post for the jib, a knife-edge at the bottom of said post for the purpose of forming a fulcrum for the beam, a weighing machine, means for connecting the upper part of the post to the weighing machine, a winch drum, a load cable and means for guiding the load cable to the winch drum in a direction passing through the fulcrum of the beam, for the purpose set forth.

In witness whereof, I have hereunto signed my name in the presence of two subscribing witnesses.

EMIL SCHENCK.

Witnesses:
WILHELM GROSSMANN,
WALTER HOUSING.